Patented Oct. 21, 1947

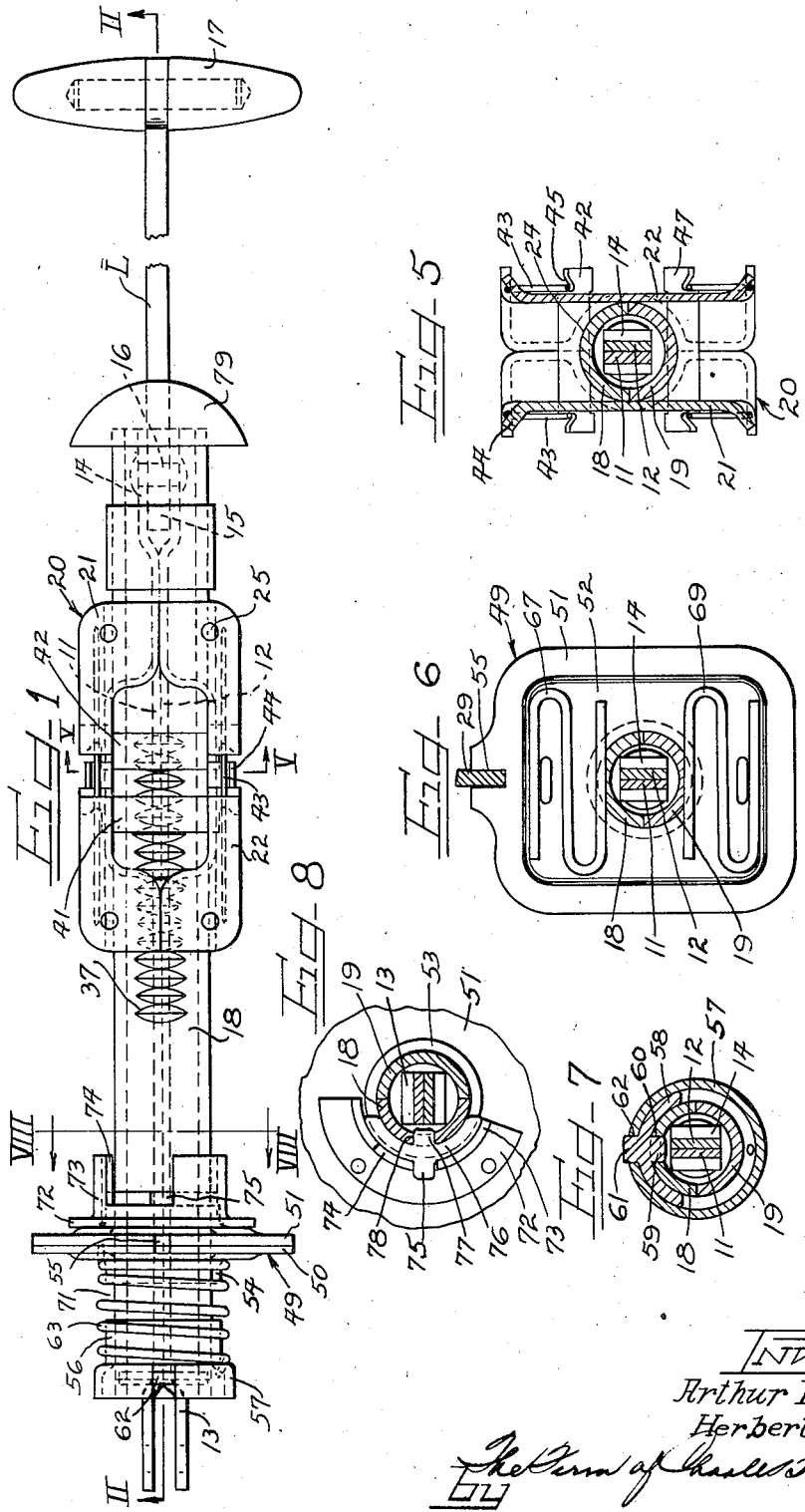

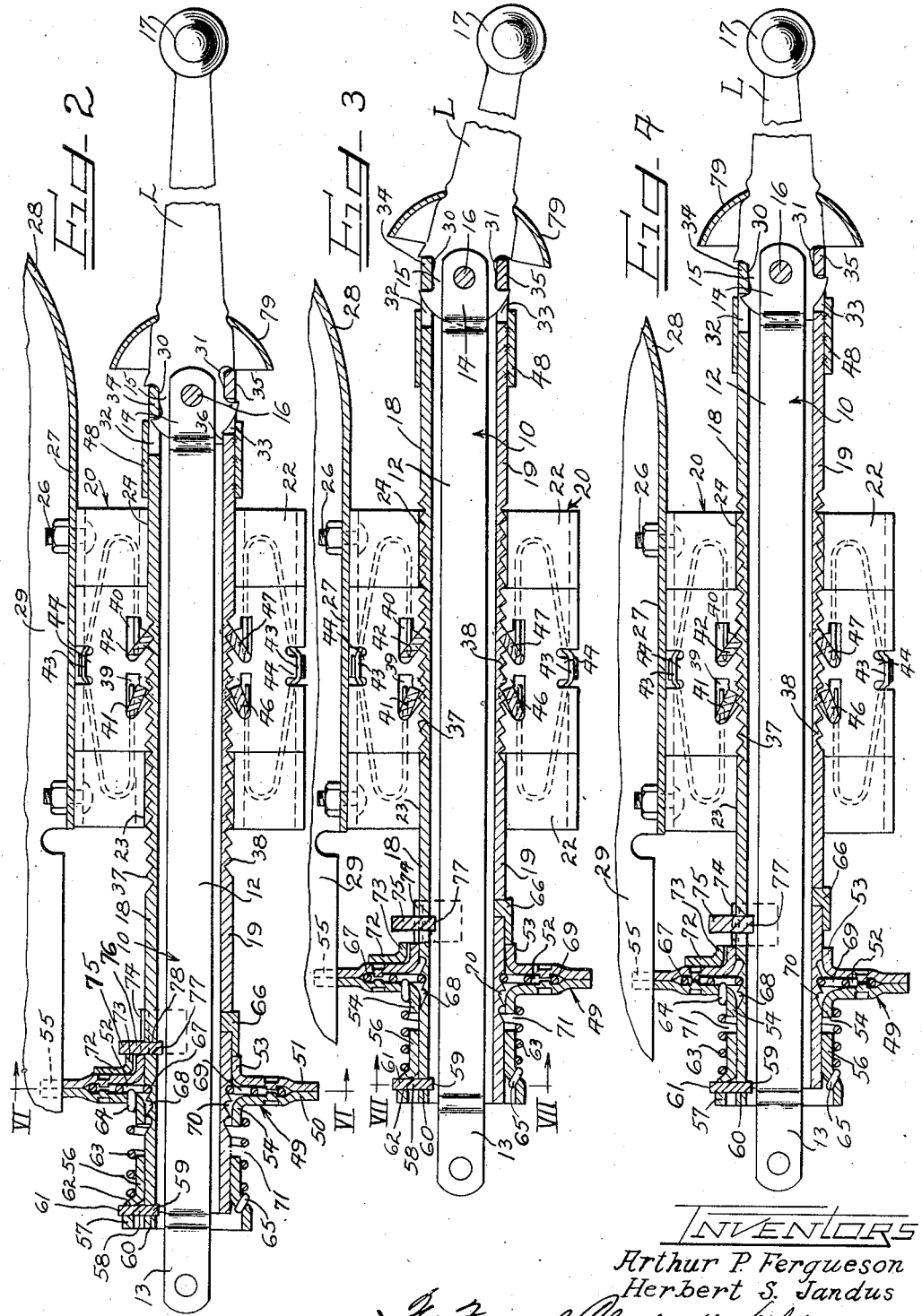

2,429,224

UNITED STATES PATENT OFFICE 2,429,224

AUTOMOBILE BRAKE OPERATING STRUCTURE

Arthur P. Fergueson and Herbert S. Jandus, Detroit, Mich., assignors to Houdaille-Hershey Corporation, Detroit, Mich., a corporation of Michigan Application December 21, 1944, Serial No. 569,137

18 Claims. (Cl. 74—503)

Our invention relates to brake operating structure adapted particularly for operating and controlling emergency or parking braking in automotive vehicles such as automobiles.

In the usual brake operating hook-up in an automobile, the cable or linkage which extends from the brake shoes into the driver's compartment is attached to the conventional brake lever which is fulcrumed at its upper end to be grasped at its lower end for rearward swing by the driver for setting of the brakes. The usual leverage ratio of such hook-up may be approximately 4 to 1, and therefore the grip end of the lever must move through from eight to ten inches to accomplish brake setting. Usually about 15 to 20% of this motion is used to take up the clearance between the brake shoe lining and the brake drum, the resistance to such movement being only the force of the brake return spring plus the friction in the system. During the last part of the lever swing the driver must exert increased pull on the lever through this 4 to 1 ratio for setting of the brakes to properly brake the vehicle. In some brake hook-ups, the fulcrumed brake lever is not situated to be directly grasped manually for brake operation, but a pull rod or bar structure is connected with the lever and mounted in the vehicle for straight rearward pull by the driver for swing of the brake lever and setting of the brakes, and during the latter portion of pull on the bar structure the driver must exert additional pull force to get the brakes fully set. In such pull bar arrangement releasable ratchet means are usually provided for holding the pull bar structure in brake setting position.

Our invention is of particular utility in connection with brake operating hook-ups operated by pull on a pull bar structure, the general object of the invention being to provide simple operating means in connection with the pull bar structure whereby, after an initial shift of the pull bar structure to take up the slack or clearance between the brake shoes and the brake drum to bring the shoes into engagement with the drum, the pull bar structure may be incrementally shifted under a comparatively high leverage ratio to bring the brake shoes into the desired final braking engagement with the drum.

An important object of the invention is to provide a pull bar structure having handle means by which the bar structure may be bodily shifted to take up the brake slack, together with ratchet controlled holding mechanism for the bar structure alternately operable by vertical oscillation or swing of the handle means under high leverage ratio to move the pull bar assembly for the final setting of the brakes.

A further object is to provide a pull bar assembly comprising a main bar connectable at one end through cable or linkage with the brake shoes and at its other end having a handle lever fulcrumed thereto, together with dog controlled ratchet bars extending longitudinally of the main bar and having connection with the handle lever for alternate advancement thereof and of the main bar when the lever handle is oscillated to thereby apply the final brake setting pull to the main bar.

Another object is to provide simple means for limiting the pull movement of the pull bar assembly to prevent undue straining or loading of the brake mechanism.

Still another object is to provide improved means for releasing the ratchet holding mechanism when the brakes are to be released.

The above referred to and other features of our invention are embodied in the structure disclosed on the drawings, in which Figure 1 is a plan view of the pull bar assembly;

Figure 2 is a section on plane II—II, Figure 1, showing the pull bar assembly in brake release position;

Figure 3 is a similar section showing the pull bar assembly having been pulled out to take up the brake slack and with the handle lever swung down for the first increment of additional braking movement of the assembly;

Figure 4 shows a similar section but with the handle lever returned to its up position for a further shift increment of the assembly toward final brake setting;

Figure 5 is a section on plane V—V, Figure 1;

Figure 6 is a section on plane VI—VI, Figure 2;

Figure 7 is a section on plane VII—VII, Figure 3; and

Figure 8 is a section on plane VIII—VIII, Figure 1.

The pull bar structure or assembly is shown as comprising a tension member 10 formed by two flat bars 11 and 12 secured together throughout their length as by spot-welding but separated at their ends to provide the clevises 13 and 14. When the assembly is in service, a cable or linkage extends from the brakes to be secured to the clevis 13. The clevis end 14 receives the hub portion 15 of a lever L and receives the fulcrum pin 16 supported by the clevis, the outer end of the lever terminating in a cross structure 17 forming a handle or grip.

The bar or tension member 10 extends through a tubular structure formed by upper and lower ratchet or setting members 18 and 19 in the form of semi-circular channels which extend through and are slidably supported in a bracket 20 which consists of similar halves 21 and 22 in the form of stampings welded together to form a boxlike structure with their middle portions at the ends thereof expanded to form cylindrical guide passageways 23 and 24, respectively, for receiving the ratchet members 18 and 19. The upper walls of the stampings 21 and 22 of the bracket 20 have holes 25 therethrough for receiving bolts 26 for securing the bracket to the flange or lip 27 extending forwardly from the instrument panel 28. A vertical brace wall 29 is shown extending from the instrument panel above the lip 27 to be secured to the vehicle dashboard.

The hub portion 15 of the lever L has upper and lower notches 30 and 31 therein, the bottoms of these notches being arcuate to the axis of the fulcrum pin 16. The ratchet members 18 and 19 have respectively the slots 32 and 33 therein, the circumferential widths of these slots being substantially the axial width of the hub portion 15, and the portions 34 and 35 at the ends of the ratchet members 18 and 19 outside of the slots are received in the notches 30 and 31, respectively, in the hub 15, the axial widths of the end portions 34 and 35 being the widths of the notches 30 and 31. The hub 15 inwardly of the end portions 34 and 35 extends into the slots 32 and 33.

As shown on Figure 2, the lever L normally extends with its axis coinciding with the axis of the tension member 10, the lever being held against upward movement from this normal position by engagement of the stop shoulder 36 on the lever hub 15 with the lower ratchet member 19 inwardly of the slot 33.

The upper ratchet member 18 is transversely notched on its upper side to provide a row of ratchet teeth 37 while the ratchet member 19 on its underside is transversely notched to provide ratchet teeth 38. The side walls of the bracket 20, inwardly of the cylindrical guide passageways 23 and 24 therethrough for the ratchet members, have opposed front and rear openings 39 and 40 therethrough above the upper ratchet member 18 through which pawls 41 and 42 in the form of rectangular plates extend for cooperation with the teeth 37. The pawls abut and fulcrum against the front ends of the openings whose lower portions are of segment shape to permit the pawls to swing into or out of engagement with the teeth on the ratchet member 18. Hair pin springs 43 are provided at the outer sides of the bracket 20 which are clamped in place by the engagement therewith of tongues 44 deflected from the side walls of the bracket, the ends of the springs engaging respectively with the outer ends of the pawls 41 and 42 which project beyond the side walls of the bracket 20, as best shown on Figure 5, the pawls preferably having notches 45 for receiving the spring ends. As shown on Figure 2, the pawl plates are inclined downwardly, with the ends of the springs engaging the ends of the pawls below their fulcrum edges and thus tend to swing and hold the pawls down for engagement with the teeth on the ratchet member 18. The pawls are spaced apart longitudinally of the ratchet member 18 a half pitch more than an even multiple of the pitch of the ratchet teeth 37 so that when the rear pawl 42 has its end in a tooth notch, the end of the other pawl will be only half-way out of a notch, this, as will be further referred to later, assuring a half-tooth adjustment when setting the brakes.

For the lower ratchet member 19, pawls 46 and 47, similar to the pawls 41 and 42 are provided in the bracket 20 held in engagement with the teeth 38 by springs 43. Referring to Figure 2, which shows the pull bar assembly in its normal position with the brakes released, the lower ratchet bar 19 extends rearwardly beyond the end of the upper ratchet bar 18 by a distance equal to the distance between two ratchet teeth. When the brakes are to be set, the driver grasps the handle 17 of the lever L and pulls straight rearwardly to take up the slack and to bring the brake shoes against the brake drum, the tension bar member 10 and the ratchet members 18 and 19 then moving together without relative movement, and after such bodily movement of the pull bar assembly the pawls will prevent return of the assembly. The driver now swings the lever L down and back up a sufficient number of times until the brake shoes have been finally set for the desired degree of braking.

Figure 3 shows the pull bar assembly having been pulled out to take up the slack and the lever L swung down for applying final braking tension. During such down swing of the lever L the lever fulcrums against the outer end of the lower ratchet member 19 by the engagement of the outer edge of the notch 31 with the member 19, the inner edge of the upper notch 30 being then in engagement with the outer portion 34 of the upper ratchet member 18 to cause this member to be shifted rearwardly, the distance of such rearward shift being shown as the distance between two ratchet teeth, the rear end of the upper ratchet member 18 being then in alignment with the corresponding end of the lower ratchet member 19. As the axis of the fulcrum pin 16 is midway between the notches 30 and 31 in the lever hub 15, the rearward shift of the tension member 10 will be only one-half that of the rearward shift of the upper ratchet member 18. For example, if by the downward swing of the lever L the upper ratchet member 18 were shifted rearwardly a distance of say $\frac{1}{16}$ of an inch, then the tension bar 10 would be shifted rearwardly only half that distance or $\frac{3}{32}$ of an inch, this movement being communicated to the brake shoes for corresponding pressure engagement thereof with the brake drum. If the first downward swing of the lever L is not sufficient to set the brakes as desired, the lever may be swung back upwardly, as indicated on Figure 4, and during such upward swing the lever will fulcrum against the rear end of the upper ratchet member 18 and will shift the lower ratchet member 19 rearwardly by a distance, as shown on the drawings, equal to the distance between two teeth, and if this distance were $\frac{1}{16}$ of an inch, then the movement of the tension member 10 would be $\frac{3}{32}$ of an inch so that by a downward swing and return swing of the lever L the tension member 10 would have been pulled out a distance of $\frac{3}{16}$ of an inch to correspondingly increase the pressure engagement of the brake shoes on the brake drum. If still greater braking is desired it can be effected by further swinging of the lever, and at the end of the final brake setting operation, the pawls 42 and 47 will engage with the ratchet bars 18 and 19 to hold them in set position. If the lever is not swung full distance for the final brake setting, but over half full distance, then the pawls 41 and 46 will engage with the ratchet members 18 and 19 to hold them in set position. The length of the lever is such that the desired leverage ratio is provided. For example, the distance from the fulcrum of the lever to the handle end thereof might be five inches and the distance between the fulcrum axis and the abutment edges of the lever slots might be one-half inch, in which case we would have a leverage ratio of 10 to 1, which leverage ratio requires comparatively small effort on the part of the driver to swing the lever L for final brake setting. To hold and guide the ratchet members 18 and 19 during their alternate longitudinal shifting by operation of the lever L, a sleeve 48 surrounds the members adjacent to the lever hub and, as shown, is secured to the lower ratchet member 19 as by welding.

In order to prevent undue loading of the brake mechanism, structure is provided for limiting the setting movement of the pull bar assembly by the lever L. This structure comprises a housing 49 formed by two stampings 50 and 51 secured together along their peripheral portions as by welding to leave a chamber 52. As shown on Figure 6, the housing may be rectangular. The wall or stamping 51 has the rearwardly extending annular hub 53, and the stamping or wall 50 has the forwardly extending annular hub 54, these hubs receiving and surrounding the upper and lower ratchet members 18 and 19. At its upper side the housing 49 has a guide slot 55 which receives the brace member 29, the housing being thus held against rotary movement but may shift axially.

A collar 56 receives the front end of the ratchet members 18 and 19, the outer portion 57 of this collar being of increased diameter. As best shown on Figure 7, an arcuate key 58 is interposed between the end 57 of the collar and the end of the upper ratchet member 18 and this key has an inner tooth 59 extending into the opening 60 in the ratchet member 18, the upper tooth 61 on the key projecting through the opening 62 in the end 57 of the collar, the collar being thus keyed to the ratchet member 18 against rotational or axial movement relative thereto. A coil spring 63 encircles the collar 56 and the hub 54 on the housing 49 with its one end 64 anchored to the housing 49 and its other end 65 anchored to the collar 56. An abutment 66 is provided on the lower ratchet member 19 against which the housing 49 is normally held by the pressure of the spring 63.

Within the upper part of the chamber 52 in the housing 49 a pawl 67 in the form of an S-shape spring is mounted for cooperation with the teeth 68 on the upper ratchet member 18, these teeth being in longitudinal alignment with the teeth 37 and being of the same pitch. Within the lower part of the chamber 52 is the pawl 69 in the form of an S-shape spring for cooperating with the teeth 70 on the lower ratchet member 19 in alignment with the teeth 38 and of the same pitch. The stop 66 is so located, that when the pull bar assembly is in its forward position for brake release, as shown on Figure 2, the distance 71 between the collar 56 and the hub 54 will determine the limiting amount of final brake setting by oscillation of the lever L. With the housing 49 against the stop 66, the spring pawls 67 and 69 within the housing are in proper alignment with the teeth 68 and 70.

When the pull bar assembly is pulled by the handle 17 to take up the slack in the brake assembly and in the brake line, the housing 49 moves with the assembly to the position shown on Figure 3. After such outward pull of the assembly and then down swing of the lever L, the lever fulcrums on the lower ratchet member 19 which is held against forward shift by the pawl 47 and the upper ratchet member 18 is shifted rearwardly, the collar 56 moving with the member 18 towards the housing 49 which is held against axial movement by the stop 66 on the lower ratchet member 19, and at the end of the rearward shift of the member 18, the upper pawl spring 67 will come into engagement with the next tooth 68 and the pawl 42 will be in engagement with a tooth on the ratchet member 18 so that this ratchet member will be held against forward movement. By the down swing of the lever L the space 71 between the collar 56 and the housing 49 was decreased by a distance of one ratchet tooth, as shown on Figure 3.

If the lever L is now swung back upwardly, as shown on Figure 4, the lever will fulcrum against the end of the upper ratchet bar 18 and the lower ratchet bar will be shifted rearwardly in the frame 49 which is being held against axial movement by the engagement of the upper spring pawl 67 with a tooth 68. This rearward shift of the ratchet member 19 will be the distance of one tooth so that the spring pawl 69 will then be in engagement with the next tooth 70 on the ratchet member 19 as shown on Figure 4. Now, if the lever L is again swung down, from the position shown on Figure 4, the upper ratchet member 18 will be shifted rearwardly in the housing 49 to bring the next tooth 68 behind the pawl spring 67, the housing 49, during such rearward shift of the ratchet member 18, being held against axial movement by the engagement of the spring pawl 69 with a tooth 70, the lower ratchet member 19 being held against forward shift by the pawl 47. During downward swing of the lever L from the position shown on Figure 4, the collar 56 will move with the upper ratchet member 18 and the space 71 will be further reduced, and as soon as the collar comes into engagement with the housing 49 the lever L will be checked against further swing to thus prevent undue loading of the brake mechanism. During rearward shift of the ratchet member 19 relative to the ratchet member 18, the stop 66 moves with the ratchet member 19 away from the housing 49, but this housing is then held against axial movement by the pawls 67 and 69 to form the stop for the collar 56 to limit the brake setting by the lever L.

Provision is made for release of the pull bar assembly from the various pawls so that, after a brake setting, the assembly may be shifted forwardly for release of the brakes. The release is accomplished by rotation of the assembly by means of the handle 17, a distance of such turning movement moving the ratchet teeth rows away from the pawls and bringing smooth surfaces on the ratchet members 18 and 19 below the pawl ends so that the assembly will then be free to be returned to brake release position. The spring 63, besides functioning as a compression spring between the collar 56 and the housing 49, functions as a torsion spring for normally holding the pull bar assembly in normal position with the tooth rows in alignment with the pawls and for returning the assembly to normal position after rotation thereof for brake release. Stop means are provided for limiting the rotational movement of the assembly. A bracket 72 is riveted or welded to the rear side of the housing 49 and has the arcuate flange 73 extending rearwardly therefrom above the upper ratchet member 18. The flange has an axially extending slot 74 into which projects the tooth 75 on the arcuate key 76 between the flange and the member 18, an inner tooth 77 on this key extending through an opening 78 in the member 18, the key thus being movable rotatably and axially with the member 18. The torsion force of the spring 63 will normally hold the tooth 75 against one edge of the slot 74 to normally align the ratchet teeth with the various pawls. When the brakes are to be released after a brake setting operation of the pull bar structure, the handle 17 is turned for rotation of the ratchet members 18 and 19 for movement of the teeth thereon away from the pawls, this turning movement being limited by the engagement of the tooth 74 with the opposite edge of the slot 74. Then after the pull bar assembly has been shifted forwardly for release of the brakes the handle is released and the spring 63 will rotate the assembly back to its normal position for cooperation of the ratchet teeth with the pawls. As the ratchet member 18 is shifted rearwardly during the oscillation of the lever L for final brake setting, the key 76 will move therewith, and the slot 74 is therefore made of sufficient axial extent for cooperation with the key when the assembly is rotated for brake release. To protect the driver's fingers, a shield 79 is preferably provided on the lever L in front of the end of the bar assembly.

In the normal position of the pull bar assembly, shown on Figure 2, and during bodily rearward shift of the assembly for slack take up, the key 76 will assist the stop 66 in holding the housing 49 against the pressure of spring 63 for proper alignment of the spring pawls 67 and 69 in the housing with the teeth 68 and 70, respectively. Then when the lever L is swung down to start the final braking operation, the springs in the housing and the stop 66 will hold the housing 49 against axial movement while the spring 63 is further compressed. Thereafter, during further swings of the lever L, the pawl springs within the housing 49 will hold the housing against axial movement.

With the operation as hereinbefore described, the lever L was swung for only one tooth advance of the respective ratchet members 18 and 19, but it is evident that the lever may be given longer swings for a number of tooth advancements of the respective ratchet members. The bodily outward pull of the pull bar assembly by the lever may be sufficient not only to take up the brake slack but to apply considerable brake shoe pressure against the drum, in which case, if more braking effort were desired, one down swing of the lever or a down swing and an up swing might be sufficient for the final braking action desired. If by the bodily rearward pull of the brake assembly only the brake slack is taken up, then more pumping action of the lever may be required for the desired full braking setting. Where the brakes are new, or the brake shoes have just been relined, and there is very little slack, then the entire braking operation may be accomplished by pumping of the lever L.

The tension bar 10 may be connected directly by a cable with the brake shoes, or a leverage ratio brake lever may be included in the connection in which case the leverage ratio of the lever will be added to the leverage ratio of the manually operated lever L.

We have disclosed a practical and efficient embodiment of the features of our invention but we do not desire to be limited to the exact construction and arrangement shown and described as changes and modifications may be made without departing from the scope of the invention as defined in the appended claims.

We claim as our invention:

1. Automobile brake operating structure comprising a support, a pair of setting members relatively longitudinally movable in said support, pawl and ratchet interconnections between said support and said members for locking said members against return movement after brake setting movement thereof, a lever mounted to swing about an axis at the inner ends of said setting members and having abutments in engagement therewith at opposite sides of the axis whereby when said lever is swung in one direction it will fulcrum at one of said abutments on one of said setting members and have engagement at its opposite abutment with the other member for shifting said other member relative to the first member inwardly toward the lever, and means actuated upon the interaction of said lever and said setting members for operating a brake.

2. An automobile brake operating structure comprising a support, a pair of setting members movable relatively longitudinally in said support, pawl and ratchet interconnections between said support and said members for locking said members against longitudinal movement in brake release direction, a lever having abutment connections with said members so arranged that when said lever is swung it will alternately fulcrum on one of said members and will effect longitudinal shift of the other member in brake setting direction toward the lever, and means actuated upon the interaction of said lever and said setting members for operating a brake.

3. An automobile brake operating structure comprising a stationary support, a pair of relatively longitudinally movable brake setting members extending through said support, pawl and ratchet interconnections between said support and said members functioning to permit longitudinal shift of said members in brake applying direction but preventing return movement, a lever having an inner portion extending transversely between and connected with the ends of said setting members and having an outer portion by which said inner portion may be rocked with leverage ratio to be alternately fulcrumed against one of said members for shift of the other member in brake setting direction toward the lever, and means actuated upon the interaction of said lever and said setting members for operating a brake.

4. An automobile brake operating structure comprising a stationary support, a pair of relatively longitudinally movable brake setting members extending through said support, pawl and ratchet interconnections between said support and said members functioning to permit longitudinal shift of said members in brake applying direction but preventing return movement, a lever having an inner portion extending transversely between and connected with the ends of said setting members and having an outer portion by which said inner portion may be rocked with leverage ratio to be alternately fulcrumed against one of said members for shift of the other member in brake setting direction, means actuated upon the interaction of said lever and said setting members for operating the brake, and means for releasing said pawl and ratchet interconnections whereby said setting members will be free to be shifted for release of the brake.

5. An automobile brake operating structure comprising a stationary support, a pair of brake setting members relatively longitudinally shiftable in said support, ratcheting interconnections between said support and said members functioning to permit shift of said members in brake setting direction but to check movement in reverse direction, a lever having a hub portion interposed between the ends of said members and having abutment notches in opposite sides thereof, said members having abutment portions engaged in the respective notches, whereby when said lever is swung, it will alternately fulcrum on one of said setting members and will shift the other setting member in brake setting direction toward said lever, and means actuated upon the interaction of said lever and said setting members for operating a brake.

6. An automobile brake operating structure comprising a stationary guide frame, a pair of parallel setting bars extending through said frame to be guided therein for longitudinal movement, pawl and ratchet interconnections between said frame and said setting bars functioning to permit movement of said bars in brake setting direction but checking return movement thereof, a tension bar extending between said setting bars and adapted for connection with a brake to be operated, a setting lever having a hub portion extending transversely between the inner ends of said setting bars and fulcrumed between said bars to the inner end of said tension bar, abutments on said setting bars and notches in said lever hub receiving said abutments whereby, when said lever is pumped, one of said setting bars will be held by the respective pawl and ratchet interconnection and will form a fulcrum for said lever hub and the other setting bar will be shifted in brake setting direction, said brake setting movements of said setting bars being transmitted to said tension bar for movement of said tension bar and corresponding setting movement of the brake to be operated.

7. An automobile brake operating structure comprising a stationary guide support, a pair of setting bars extending through said guide support for simultaneous or relative longitudinal movement, a transmission member for transmitting the movement of said setting bars to a brake to be controlled, ratcheting interconnections between said support and the respective setting bars functioning to permit movement of said bars in brake setting direction but to check reverse movement thereof, a setting lever connected to said transmission member and having a hub portion at its inner end interposed between the adjacent ends of said setting bars and having fulcrum connections therewith, said lever having a handle at its outer end whereby said setting bars may be pulled simultaneously for taking up brake slack, the fulcrum connections between said lever hub and setting bars functioning, when said lever is pumped, to alternately shift said setting bars toward the lever for moving the lever and the transmission member and effecting final setting of the brake.

8. Automobile brake operating structure comprising a pull bar assembly for connection with a brake to be controlled, a stationary guide frame through which said assembly extends, said assembly comprising a pair of setting bars having connection with the brake to be operated and being movable together or relatively in said guide frame, pawl and ratchet interconnections between said frame and the respective guide bars functioning to permit shift of said assembly for brake application but to check reverse movement thereof, and a setting lever having fulcrum interconnection with the ends of said setting bars, whereby when said lever is pulled in a direction parallel with said setting members, said setting members will be moved together for corresponding movement of the pull bar assembly for brake slack take-up, and when said lever is swung on said fulcrum connections said setting bars will be alternately shifted in a general direction toward the lever to effect incremental movement of the pull bar assembly for final setting of the brake.

9. Automobile brake operating structure comprising a stationary guide frame adapted to be located within the automobile, a pair of parallel setting bars movable together or relatively in said guide frame, means for transmitting movement to a brake to be controlled, ratcheting interconnections between said frame and the respective setting bars functioning to permit movement of said bars for brake setting but checking return movement thereof, and a setting member having interconnection with the ends of said bars and with said transmitting means through which said bars may be shifted simultaneously for taking up brake slack and through which, under control of said ratcheting interconnections, said bars may be alternately shifted for final brake setting by advancing said ends of the bars in generally a direction toward the setting member.

10. Automobile brake operating structure comprising a stationary guide frame, a pair of brake setting bars movable together or relatively longitudinally in said frame, ratcheting interconnections between said frame and the respective setting bars whereby either bar may be shifted in brake setting direction while the other bar is held against movement in reverse direction, means for accomplishing such alternating movement of said bars in brake setting direction, and means for limiting such setting movement of the bars comprising a housing receiving said bars and having ratcheting interconnections with the respective bars whereby one of said bars is shiftable through said housing in brake setting direction while the other bar is being held against such movement, and an abutment on one of said bars engageable with said housing after a number of brake setting movements of said bars whereby to prevent further brake setting movements thereof.

11. Automobile brake operating structure comprising a stationary guide frame, a pair of brake setting bars movable together or relatively longitudinally in said frame, ratcheting interconnections between said frame and the respective setting bars whereby either bar may be shifted in brake setting direction while the other bar is held against movement in reverse direction, means for accomplishing such alternating movement of said bars in brake setting direction, means for limiting such brake setting movements of said bars comprising a housing receiving said bars and having ratcheting interconnections with the respective bars for functioning to hold said housing to the setting bar which was held immovable in said frame while the other setting bar is shifted in said frame and in said housing for brake setting, an abutment on one of said setting bars normally displaced from said housing but engaged therewith to prevent further brake setting movement of said setting bar after a number of setting movements thereof, a spring between said abutment and said housing resisting brake setting movements of said bars, means for transmitting the effects of the action of said accomplishing means and the movements of said setting bars to the brake to be operated, and means for releasing the ratcheting interconnections between said bars and said frame and housing, said spring after such release of the bars shifting said bars back into normal position relative to said housing.

12. Automobile brake operating structure comprising a stationary guide frame, a pair of brake setting bars movable together or relatively in said frame for brake setting, ratcheting interconnections between said frame and the respective bars functioning to hold either of said bars against reverse movement while the other bar is moved in brake setting direction, means for accomplishing such alternate movement of the bars in brake setting direction, means cooperating with said accomplishing means and said bars for transmitting the effects of the movements of said bars to the brake to be operated, means for limiting the number of setting movements of said bars comprising a housing receiving said bars and having ratcheting interconnections with the respective bars functioning to hold said housing to either of said bars while the other bar is being moved in brake setting direction, means holding said housing against rotating movement, means whereby rotation of said bars on a longitudinal axis will release all the ratcheting interconnections from said bars whereby said bars may be shifted for brake release, and a spring having connection with one of said bars and with said housing for resisting such rotary movement of the bars and for returning the bars to normal position for re-establishment of the ratcheting interconnections with the bars.

13. Automobile brake operating structure comprising a stationary guide frame, a pair of brake setting bars movable together or relatively in said frame for brake setting, ratcheting interconnections between said frame and the respective bars functioning to hold either of said bars against reverse movement while the other bar is moved in brake setting direction, means for accomplishing such alternate movement of the bars in brake setting direction, means cooperating with said accomplishing means and said bars for transmitting the effects of the movements of said bars to the brake to be operated, means for limiting the number of setting movements of said bars comprising a housing receiving said bars and having ratcheting interconnections with the respective bars functioning to hold said housing to either of said bars while the other bar is being moved in brake setting direction, means holding said housing against rotating movement, means whereby rotation of said bars on a longitudinal axis will release all the ratcheting interconnections from said bars whereby said bars may be shifted for brake release, a spring having connection with one of said bars and with said housing for resisting such rotary movement of the bars and for returning the bars to normal position for re-establishment of the ratcheting interconnections with the bars, and an abutment on one of said bars movable with the brake setting movement of said bar, said abutment being normally displaced from said housing but engaging therewith after a number of brake setting movements of said bars to stop further brake setting movements thereof, said spring functioning to reset said bars to normal position relative to said housing when said bars are turned for release thereof from said ratcheting inter-connections.

14. In combination in an automobile brake-operating structure, means affording a connection with the brake from a remote point and mounted for axial movement for setting and releasing the brake, a handle carried by said means for manually effecting said setting and releasing axial movements, said handle being mounted for rocking movement transversely to the axis of said means, and means responsive to said rocking movement of the handle to move the handle and said first mentioned means incrementally in the brake-setting axial direction.

15. In combination in a device for operating an emergency brake of an automobile and adapted to be mounted at or adjacent to the instrument panel or dashboard of an automobile, means at the forward end of the device for connection to a brake operating cable or the like, a handle projecting from the rear or inner end of the device mounted for back and forth rocking movement, and means disposed forwardly of the handle and between the handle and the cable-connecting means responsive to back and forth rocking movement of the handle to effect setting of the brake by the device by progressive increments.

16. In combination in a device for operating an emergency brake of an automobile and adapted to be mounted at or adjacent to the instrument panel or dashboard of an automobile, means at the forward end of the device for connection to a brake operating cable or the like, a handle projecting from the rear or inner end of the device mounted for back and forth rocking movement, and means disposed forwardly of the handle and between the handle and the cable-connecting means responsive to back and forth rocking movement of the handle to effect setting of the brake by the device by progressive increments, said handle also being rotatable and said last mentioned means being responsive to rotation of the handle to release the brake.

17. In combination in a rectilinearly acting brake operating structure, including means at one end for connection to a brake operating cable or the like, an operating handle at the opposite end, said handle being disposed to be pulled axially of the structure with the connection means to effect rectilinear brake take up movement of the connection means, said handle also being mounted for movement relative to the connection means, and means disposed between said handle and said connection means operative in said relative movement of the handle to effect incremental additional rectilinear movement of the connection means for setting the brake.

18. In combination in a rectilinearly acting brake operating structure, including means at one end for connection to a brake operating cable or the like, an operating handle at the opposite end, said handle being disposed to be pulled axially of the structure with the connection means to effect rectilinear brake take-up movement of the connection means, said handle also being mounted for movement relative to the connection means, means disposed between said handle and said connection means operative in said relative movement of the handle to effect incremental additional rectilinear movement of the connection means for setting the brake, and safety means for limiting the extent of the brake setting rectilinear movement.

ARTHUR P. FERGUESON.
HERBERT S. JANDUS.

REFERENCES CITED

The following references are of record in the file of this patent:

UNITED STATES PATENTS

| Number | Name | Date |
|---|---|---|
| 104,692 | Bilharz | June 28, 1870 |
| 65,263 | Pardee | Mar. 28, 1867 |
| 2,329,859 | Snell | Sept. 21, 1943 |
| 1,885,727 | Keesey | Nov. 1, 1932 |